United States Patent
Rao et al.

[15] 3,676,436
[45] July 11, 1972

[54] NOVEL AMINOPHENYL ALKOXY COUMARINS

[72] Inventors: Durvasula V. Rao, Hamden; Adnan A. R. Sayigh, North Haven; Henri Ulrich, Northfield, all of Conn.

[73] Assignee: The Upjohn Company, Kalamazoo, Mich.

[22] Filed: March 16, 1970

[21] Appl. No.: 20,063

[52] U.S. Cl. ................260/343.2 R, 252/300, 252/301.2 W, 117/33.3, 117/34, 117/33.5 T, 8/1 W, 260/999
[51] Int. Cl. ..........................................................C07d 7/26
[58] Field of Search ..........................................260/343.2 R

[56] References Cited

UNITED STATES PATENTS 3,074,963    1/1963    Siegel ..................................260/343.2

OTHER PUBLICATIONS

Theilheimer, " Synthetic Methods of Organic Chemistry," vol. 11, Interscience Pub., Inc., No. 32, p. 16 (1957) QD 262.T4.
Theilheimer, " Synthetic Methods of Organic Chemistry," vol. 14, Interscience Pub., Inc., No. 39, p. 19 (1960) QD 262.T4.

*Primary Examiner*—John M. Ford
*Attorney*—Steward & Steward

[57] ABSTRACT

Alkoxy - substituted 3-(aminophenyl)-coumarins are prepared by hydrogenation of the corresponding nitrophenyl-coumarin derivative in the presence of Raney nickel or a noble metal catalyst. The novel amino compounds are useful, by virtue of fluorescence in ultraviolet light, as optical brighteners, as ultraviolet light filters, in the preparation of polyureas and photoresist polymers. Also, the novel amino compounds can be phosgenated to yield the corresponding isocyanates.

2 Claims, No Drawings

NOVEL AMINOPHENYL ALKOXY COUMARINS

BACKGROUND OF THE INVENTION

1. Field of the Invention

This invention relates to novel 3-(aminophenyl)-coumarins. More particularly, this invention relates to alkoxy - substituted 3-(aminophenyl)- coumarins prepared by hydrogenation of the corresponding nitrophenylcoumarin. These novel compounds are valuable optical brighteners and are useful in the manufacture of photoresist materials.

2. Description of the Prior Art

A number of 3-phenyl coumarin compounds have been described in the art. For example, in U.S. Pat. No. 2,945,033 the preparation of a variety of 7-triazinylamino-3-phenyl-coumarins useful as optical brightening agents for synthetic detergents, etc. is disclosed while the synthesis of 3-phenyl-7-carbalkoxyaminocoumarin compounds useful for the same purpose is set forth in U.S. Pat. No. 2,929,822. Further, Cross et al. in U.S. Pat. No. 3,380,955 disclose dialkylamine-substituted 7-triazinylamino-3-phenylcoumarins and suggest the use of these compounds as optical brighteners for polyester polyols.

The novel alkoxy-substituted 3-(aminopheny)-coumarins of this invention exhibit particularly useful properties not possessed by the above known phenylcoumarins.

SUMMARY OF THE INVENTION

The present invention comprises novel compounds of the formula:

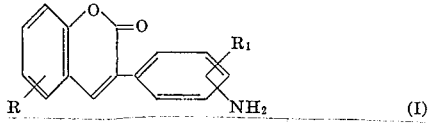

(I)

wherein R is lower alkoxy and $R_1$ is selected from the group consisting of H or $NH_2$.

Throughout this specification the term "lower alkoxy" means alkoxy of from 1 to 8 inclusive carbon atoms as exemplified by methoxy, ethoxy, propoxy, butoxy, pentyloxy, hexyloxy, heptyloxy, octyloxy and isomers thereof.

From the novel amines of formula (I) valuable isocyanate compositions of the formula:

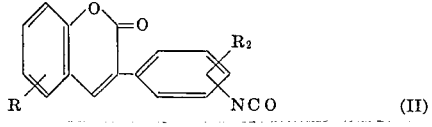

(II)

where R has the same meaning as hereinbefore defined and $R_2$ is selected from the group consisting of H and NCO, can be synthesized by treatment of the amine (I) with phosgene in the presence of an inert organic solvent, such as benzene, toluene, xylene, naphthalene, decalin, chlorobenzene, bromobenzene, o-chlorotoluene, etc. Usually the phosgene is employed in approximately the stoichiometric quantity but an excess can be utilized if desired. Processes for the preparation of isocyanates (III) are more completely described in Rao, Sayigh and Ulrich application Ser. No. 20,062 for Novel Chemical Compounds filed of even date herewith.

The monoisocyanates of formula (II) above are useful in that they can be reacted with active-hydrogen containing fibers, filaments and the like, to give products which, by virtue of the double bond present in the moiety of the compound (II), fluoresce on irradiation with ultraviolet light. Accordingly, the monoisocyanates are useful as optical brightening agents by incorporation into fabrics, fibers, and like materials made of cotton, silk, feathers, wool, cellulosic materials such as wood, jute, flax, hemp, paper, and the like, all of which contain active hydrogen atoms (i.e. hydrogen atoms which give a positive response in the Zerewitinoff reaction, J. Am. Chem. Soc. 49, 3181, 1927). When used for the above purpose the monoisocyanates (II) are incorporated into the active hydrogen containing material in accordance with conventional procedures. For example, the monoisocyanates (II) can be dissolved or dispersed in a volatile inert organic medium such as hexane, benzene, toluene, xylene, chlorobenzene, o-dichlorobenzene, tetrachlorethane, acetone, methyl ethyl ketone, ethyl acetate, dioxane, dimethylsulfone, and the like, and the resulting mixture can be applied to the active hydrogen material by coating or spraying or by dipping the latter in a bath containing the isocyanate composition. Interaction of the monoisocyanate (II) and the active hydrogen containing material generally takes place spontaneously without the necessity to apply heat. The inert organic carrier medium is subsequently removed, and, if necessary, is recovered by vacuum drying or like techniques. The monoisocyanate (II) can be applied to the active hydrogen material after the latter has been formed into a finished article or, in the case of fabrics and like materials which are fabricated from fibers, filaments, and the like, the monoisocyanate (II) can be applied to the latter prior to fabrication of a desired end product.

Alternatively, the monoisocyanates (II) can be converted to stable, water-soluble derivatives which can be incorporated in aqueous treating baths such as those commonly employed in applying optical brighteners to textile and like materials. The methods commonly employed in this art are described in Encyclopedia of Chemical Technology, Edited by Kirk-Othmer, Second Edition, Volume 3, pp. 737 to 748, 1964, Interscience, New York. The monoisocyanates (II) can be converted to watersoluble derivatives, suitable for use in the above manner, in a variety of ways. For example, said monoisocyanates (II) can be reacted with alkanolamines such as ethanolamine, diethanolamine, diisopropanolamine, and the like, to form the corresponding hydroxyalkylureas. Alternatively, said monoisocyanates (II) can be reacted with an equimolar proportion of a polyhydric alcohol such as glycerol, trimethylolpropane, dipropylene glycol, 1,2,3-hexanetriol, butanediol, hexanediol, and the like, to form the corresponding hydroxyalkyl carbamates which exhibit the required water-solubility. In a further alternative said monoisocyanates (II) can be reacted with an equimolar proportion of a polycarboxylic acid such as maleic acid, fumaric acid, oxalic acid, phthalic acid, succinic acid, and the like, to form the corresponding mono-or polycarboxy substituted amide which can be converted to the corresponding potassium, sodium, or like water-soluble salt.

Similarly, the monoamines of formula (I) can be converted to water-soluble derivatives which are employed as optical brightening agents in accordance with the procedures set forth above. For example, said amines can be reacted, using procedures well-known in the art, with dicarboxylic acids such as those exemplified above or with the anhydrides thereof, to form the corresponding half-amides of said acids. The half-amides can then be converted to the corresponding potassium, sodium, or like water-soluble salts.

The monoisocyanates (II) can also be employed as analytical tools in biochemical and like research. For example, the metabolic processes undergone by pharmaceutical agents containing one or more active hydrogen atoms in the molecule, or by proteinaceous materials and the like, in the human or animal body can be followed by tagging the molecule of said material by reaction with the monoisocyanate (II) thereby rendering said material fluorescent under the influence of ultra violet light. The subsequent progress of the tagged molecule can be followed by observing the appearance of the fluorescence corresponding to the tagged material at various sites in the human or animal organism.

Both the mono- and polyisocyanates of formula (II) and the mono- and polyamines of formula (II) are also useful in the preparation of photoresist resins, light sensitive polymers and the like. For example, light sensitive polymers can be prepared by incorporating the isocyanates of formula (II) into elastomeric polyurethanes by replacing part or, in the case of the diisocyanates of formula (II), the whole of the polyisocyanate normally used by an isocyanate of the formula (II); conventional procedures for the synthesis of such polyurethanes are described by Saunders et al., Polyurethanes, Chemistry and Technology, Part II, Interscience Publishers, 1964, pp. 299–451. The elastomers so obtained can be formed into any desired shape by molding, extruding, blowing and like procedures and then the finished product can be cured by irradiation using light energy of the appropriate wavelength whereby crosslinking occurs between the photosensitive double bonds introduced into the polymer molecule by the isocyanate (II).

Similarly, the amines (I) can be incorporated into polyamides, polyimides, and like polymers using procedures well-known in the art for the preparation of such polymers from diamines, the amines (I) being used as part or as the whole of the diamine component used to prepare the polymer. Representative procedures for the preparation of polyamides are those shown in Kirk-Othmer, ibid, Vol. 10, p. 924 et seq. Representative procedures for the preparation of polyimides are those shown, for example, in U.S. Pat. Nos. 3,249,588; 3,247,165; 3,234,181; 3,179,643; 3,179,632; and 3,179,630. Said polyimides and polyamides can be formed into any desired shape by molding, extruding, blowing and like techniques and the finished product can be cured by irradiation using light energy of the appropriate wavelength whereby crosslinking occurs between the photosensitive double bonds introduced into the original polymer molecule via the amine (I).

The isocyanates of formula (II) and/or the amines of formula (I) can be used in the preparation of photoresist resins. Thus, said compounds (I) and/or (II) can be incorporated into polymers which are useful as auxiliaries in the photographic reproduction art. For example, said polymers can be applied as a solution to paper, metal, and like film supports normally employed in the reproduction art, to form a film on said support. Using the supported film so produced, it is possible to produce prints from negatives, e.g., lined, screened or half tone negatives or diapositives, by interposing the negative between a source of light and the supported film. The photosensitive polymer in those portions of the supported film which receive light is crosslinked by the action of the light and rendered insoluble. The amount of crosslinking is directly proportional to the amount of light received. After exposure of the film the polymer which has not been affected by the light is dissolved out by means of a solvent, leaving the crosslinked, insoluble, light-sensitized polymer on the surface of the film support in the form of a positive image corresponding to the negative used in the irradiation step. Said image is resistant to solvents, acids, alkalies, water, etc., as well as to abrasion, mechanical stresses and the like and hence possesses obvious advantages over images prepared by hitherto conventional reproduction processes.

The processes by which the isocyanates (II) and amines (II) are incorporated into such photosensitive polymers include the various processes known in the art for making supported and unsupported films of polyurethanes, polyamides and the like, supra, as well as those described in, for example, U.S. Pat. No. 2,948,706. The latter patent is also representative of the procedures known in the art for the utilization of photosensitive polymers in the above-discussed methods of reproduction. Said procedures can be readily adapted to the same use of photosensitive polymers prepared from the isocayantes (II) and the amines (II) in accordance with this invention. Further illustrative of the methods which the compounds (I) and (II) can be incorporated into light sensitive polymers are those discussed in detail by J. Korsar, Light Sensitive Systems, John Wiley and Sons, Inc. New York, 1965, particularly at pp. 137–157.

DETAILED DESCRIPTION OF THE INVENTION

The novel amine compounds (I) of this invention are obtained by hydrogenating a compound of the formula:

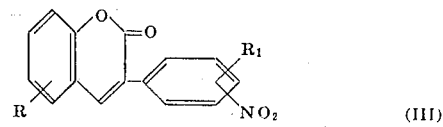

(III)

wherein R and $R_1$ have the same meaning as previously set forth, at an elevated pressure and in the presence of a catalyst selected from the group consisting of Raney nickel and a noble metal. Preferably, the reaction is conducted in the presence of an inert organic solvent, such as methanol, ethanol, n-propanol, isopropanol, etc. The amount of the inert organic solvent employed is not critical although usually an amount equal to about 10 to about 95 percent or more, based on the weight of the reaction mixture, is used. The hydrogenation reaction can be conducted at a temperature of about 25° C. to about 30° C. The pressure employed can be varied widely depending on other reaction variables. Generally, the pressure will be about 30 to about 60 p.s.i.g. and, preferably, will be about 40 to about 50 p.s.i.g. In addition to Raney nickel, other useful catalysts include the noble metals, such as palladium, platinum, rhodium, mixtures thereof, etc.

The nitro compounds which are employed as starting materials in the synthesis of the amines (I) can be represented by the formula:

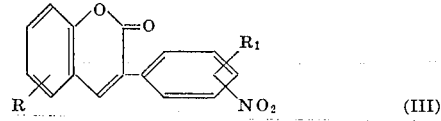

(III)

wherein R and $R_1$ have the significance hereinbefore defined. Said nitro compounds (III) can be prepared by conventional procedures. For example, said nitro compounds (III) can be prepared by condensing the appropriate aldehyde:

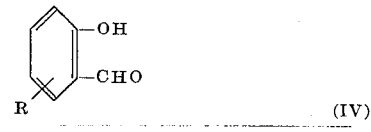

(IV)

wherein R has the significance hereinbefore defined, with the appropriate nitrophenylacetic acid ester:

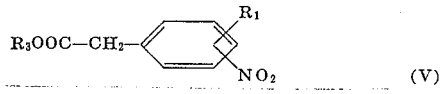

(V)

wherein $R_1$ and $R_3$ have the significance hereinbefore defined. Said condensation is generally carried out in the presence of piperidine or like secondary aliphatic amines. The condensation of said aldehyde (IV) and said nitrophenylacetic acid (V) can be carried out, illustratively, under the conditions described by Ulrich and Sayigh, J. Org. Chem. 31, 4146 (1966) for the condensation of ethyl 4-nitrophenylacetate with 2-hydroxy-5-methoxybenzaldehyde in the presence of piperidine to prepare 3-(4'-nitrophenyl)-6-methoxycoumarin.

The hydroxyaldehydes (IV) and the nitrophenylacetic acid esters (V) employed as starting materials in the synthesis of the nitrophenylcoumarins (III) are for the most part known in the art and can be prepared by general procedures which are well established in the art. Typical methods for the preparation of hydroxyaldehydes (IV) and nitrophenylacetic acid esters (V) are summarized at pages 507 et seq. and page 593 et seq., respectively, of Chemistry of Carbon Compounds, Edited by E.H. Rodd, Vol. IIIA, Elsevier, New York, 1954.

The preparation of the nitrophenylcoumarins (III) employed as starting materials in the process of this invention is further illustrated and exemplified in Preparations 1–5 set forth hereinafter.

The following preparations and examples illustrate various embodiments of the invention and set forth the best mode contemplated by the inventors of carrying out the invention but are not to be construed as limiting.

Preparation 1

3-(4'-nitrophenyl)-6-methoxycoumarin

A mixture of 17 g. of 2-hydroxy-5-methoxybenzaldehyde, 21 g. of ethyl 4-nitrophenylacetate and 1.5 ml. of piperidine in 200 ml. of chlorobenzene was refluxed for 75 minutes while the generated water was removed by azeotropic distillation. Filtration of the resulting mixture yielded 25.4 g. (76.4 percent of the theoretical yield) of 3-(4'-nitrophenyl)-6-methoxycoumarin of the formula:

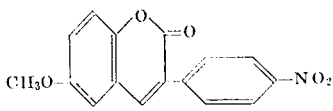

having a melting point of 275°-281° C. Recrystallization from glacial acetic acid gave a melting point of 284°-285° C22(lit. m.p. 278° C. as reported by Ulrich and Sayigh, J.Org. Chem. 31, 4146 (1966)).

Preparation 2

3-(2',4'-dinitrophenyl)-6-methoxycoumarin and 3-(3'4'-dinitrophenyl)-6-methoxycoumarin.

Employing the procedure of Preparation 1 but substituting n-propyl 2,4-dinitrophenylacetate and isopentyl-3,4-dinitrophenylacetate for ethyl 4-nitrophenylacetate there are obtained in comparable yield 3-(2',4'-dinitrophenyl)-6-methoxycoumarin and 3-(3'4'-dinitrophenyl)-6-methoxycoumarin.

Preparations 3-5

3-(4'-nitrophenyl)-7-n-pentyloxycoumarin, 3-(4'-nitrophenyl)-6-isobutoxycoumarin, and 3-(4'-nitrophenyl)-8-isooctyloxycoumarin.

Using the procedure of Preparation 1 but replacing 2-hydroxy-5-methoxybenzaldehyde with 2-hydroxy-4-n-pentyloxybenzaldehyde, 2-hydroxy-5-isobutoxybenzaldehyde or 2-hydroxy-3-isooctyloxy-benzaldehyde, there are obtained 3-(4'-nitrophenyl)-7-n-pentyloxycoumarin, 3-(4'-nitrophenyl)-6-isobutoxycoumarin, and 3-(4'-nitrophenyl)-8-isooctyloxycoumarin, respectively.

Example I  63-(4'-aminophenyl)-6-methoxycoumarin.

To 12 g. of 3-(4'-nitrophenyl)-6-methoxycoumarin in 700 ml. of methanol 4.0 g. of wet Raney nickel catalyst was added and the mixture hydrogenated at a pressure of 51 p.s.i.g. Over a period of 8 hours the required amount of hydrogen was absorbed. The mixture was filtered and, after evaporation of the solvent, there was obtained 10 g. (92.5 percent of the theoretical yield) of 3-(4'-aminophenyl)-6-methoxycoumarin of the formula:

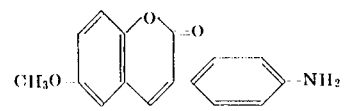

having a melting point of 149°–150° C. after recrystallization from benzene.

Analysis-Calc'd. for $C_{16}H_{13}NO_3$: C,71.90; H,4.90; N,5.24. Found: C,71.63; H,4.82; N,5.12.

Example II

Following the procedure of Example I but using in place of 3-(4'-aminophenyl)-6-methoxycoumarin as a reactant:

3-(2'4'-dinitrophenyl)-6-methoxycoumarin,
3-(3'5'-dinitrophenyl)-6-methoxycoumarin,
3-(2'-nitrophenyl)-7-n-pentyloxycoumarin,
3-(3'-nitrophenyl)-6-isobutoxycoumarin, or
3-(4'-nitrophenyl)-8-isooctyloxycoumarin, there are obtained in good yield:

3-(2'4'-diaminophenyl)-6-methoxycoumarin,
3-(3'5'-diaminophenyl)-6-methoxycoumarin,
3-(2'-aminophenyl)-7-n-pentyloxycoumarin,
3-(3'-aminophenyl)-6-isobutoxycoumarin, and
3-(4'-aminophenyl)-8-isooctyloxycoumarin, respectively.

What is claimed is:

1. A compound of the formula:

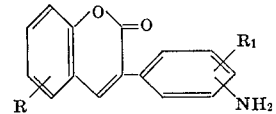

wherein R is lower alkoxy and $R_1$ is selected from the group consisting of H and $NH_2$.

2. 3-(4'-aminophenyl)-6-methoxycoumarin.

* * * * *